United States Patent
Chen et al.

(10) Patent No.: US 10,178,285 B2
(45) Date of Patent: Jan. 8, 2019

(54) DOUBLE-CAMERA IMAGING DEVICE

(71) Applicants: TRIPLE WIN TECHNOLOGY(SHENZHEN) CO.LTD., Shenzhen (CN); HON HAI PRECISION INDUSTRY CO., LTD., New Taipei (TW)

(72) Inventors: Shin-Wen Chen, New Taipei (TW); Ye-Quang Chen, New Taipei (TW)

(73) Assignees: TRIPLE WIN TECHNOLOGY (SHENZHEN) CO. LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/823,720

(22) Filed: Nov. 28, 2017

(65) Prior Publication Data

US 2018/0302538 A1    Oct. 18, 2018

(30) Foreign Application Priority Data

Apr. 17, 2017   (CN) .................... 2017 2 0398649 U

(51) Int. Cl.
| | | |
|---|---|---|
| *G03B 35/00* | (2006.01) | |
| *H04N 5/225* | (2006.01) | |
| *F16M 11/18* | (2006.01) | |
| *G03B 35/04* | (2006.01) | |
| *G03B 17/56* | (2006.01) | |
| *G03B 35/24* | (2006.01) | |

(52) U.S. Cl.
CPC ......... *H04N 5/2253* (2013.01); *H04N 5/2257* (2013.01); *F16M 11/18* (2013.01); *G03B 17/56* (2013.01); *G03B 35/00* (2013.01); *G03B 35/04* (2013.01); *G03B 35/24* (2013.01)

(58) Field of Classification Search
CPC ...................................................... G03B 35/24
USPC ............................................................ 396/329
See application file for complete search history.

(56) References Cited

U.S. PATENT DOCUMENTS

| | | | | |
|---|---|---|---|---|
| 7,422,382 B2* | 9/2008 | Seo | ....................... | H04N 5/2251 348/E5.025 |
| 7,720,374 B2* | 5/2010 | Kim | .................. | H01L 27/14625 348/374 |
| 8,430,579 B2* | 4/2013 | Tam | ....................... | G03B 17/02 396/529 |
| 9,077,881 B2* | 7/2015 | Lee | ....................... | H04N 5/2257 |
| 9,746,690 B2* | 8/2017 | Enta | ..................... | G02B 27/646 |
| 9,781,345 B1* | 10/2017 | Miller | ................ | H04N 5/23287 |
| 2001/0050721 A1* | 12/2001 | Miyake | ............. | H01L 27/14618 348/374 |
| 2005/0046740 A1* | 3/2005 | Davis | ................... | H04N 5/2254 348/373 |

(Continued)

FOREIGN PATENT DOCUMENTS

CN          206294242         * 6/2017   ............ H04N 5/225

*Primary Examiner* — Clayton E Laballe
*Assistant Examiner* — Kevin Butler
(74) *Attorney, Agent, or Firm* — ScienBiziP, P.C.

(57) ABSTRACT

A double-camera imaging device includes a base bracket and two camera units. The base bracket comprises a base plate, each camera unit comprises a printed circuit board, and the two camera units are fixed on the base plate and spaced apart each other via the printed circuit boards fixed on the base plate. The base bracket is configured to protect the two camera units from external force attack.

17 Claims, 5 Drawing Sheets

(56) References Cited

U.S. PATENT DOCUMENTS

| | | | |
|---|---|---|---|
| 2006/0115265 A1* | 6/2006 | Elberbaum | F16M 11/18 396/427 |
| 2007/0122146 A1* | 5/2007 | Ryu | G03B 17/00 396/529 |
| 2007/0253697 A1* | 11/2007 | Kim | G03B 3/00 396/275 |
| 2010/0046935 A1* | 2/2010 | Horidan | G02B 7/10 396/133 |
| 2010/0098394 A1* | 4/2010 | Ishihara | G02B 27/646 396/55 |
| 2010/0150545 A1* | 6/2010 | Imai | G02B 7/102 396/535 |
| 2011/0001847 A1* | 1/2011 | Iwasaki | H04N 5/23296 348/240.3 |
| 2011/0286737 A1* | 11/2011 | Kim | G03B 17/02 396/533 |
| 2012/0039596 A1* | 2/2012 | Hou | G02B 27/0006 396/535 |
| 2012/0086784 A1* | 4/2012 | Oh | H04N 5/2251 348/47 |
| 2012/0288272 A1* | 11/2012 | Pavithran | G03B 17/12 396/529 |
| 2013/0162894 A1* | 6/2013 | Lee | H04N 5/225 348/373 |
| 2013/0287383 A1* | 10/2013 | Haruguchi | G03B 3/10 396/133 |
| 2014/0212127 A1* | 7/2014 | Chen | H04N 5/2257 396/542 |
| 2015/0264231 A1* | 9/2015 | Murayama | G02B 7/02 348/308 |
| 2016/0241763 A1* | 8/2016 | Jung | H04N 5/2257 |
| 2017/0045753 A1* | 2/2017 | Enta | G02B 7/04 |
| 2017/0064172 A1* | 3/2017 | Vittu | H04N 5/2253 |
| 2017/0085764 A1* | 3/2017 | Kim | H04N 5/2258 |
| 2017/0094182 A1* | 3/2017 | Miller | H04N 5/23296 |
| 2017/0324906 A1* | 11/2017 | Kang | G02B 7/28 |
| 2017/0336699 A1* | 11/2017 | Hu | G02B 7/09 |
| 2017/0353634 A1* | 12/2017 | Kim | H04N 5/2252 |
| 2018/0007244 A1* | 1/2018 | Wang | H04N 5/2252 |
| 2018/0027185 A1* | 1/2018 | Miller | H04N 5/23287 |
| 2018/0100986 A1* | 4/2018 | Kim | G02B 7/04 |

* cited by examiner

DOUBLE-CAMERA IMAGING DEVICE

FIELD

The subject matter herein generally relates to an imaging technical field, and, especially, to a double-camera imaging device.

BACKGROUND

Recently, with the rapid development of electronic products, digital cameras. High-end portable electronic devices, such as mobile phones and PDAs (Personal Digital Assistants), are being developed to be increasingly multi-functional. Many of these portable electronic devices are equipped with digital cameras. Double-camera imaging devices are able to achieve many features, such as fast speed focus, aperture adjustment, night enhancement, 3D image synthesis, and so on. However, optical axes of the two camera units contained in the double-camera imaging devices are difficult to adjust when they assembled together, and imaging effect is difficult to guarantee.

Therefore, it is desirable to provide an double-camera imaging device which can overcome the above-mentioned disadvantages.

BRIEF DESCRIPTION OF THE DRAWINGS

Implementations of the present technology will now be described, by way of example only, with reference to the attached figures.

DETAILED DESCRIPTION

Figure 1:
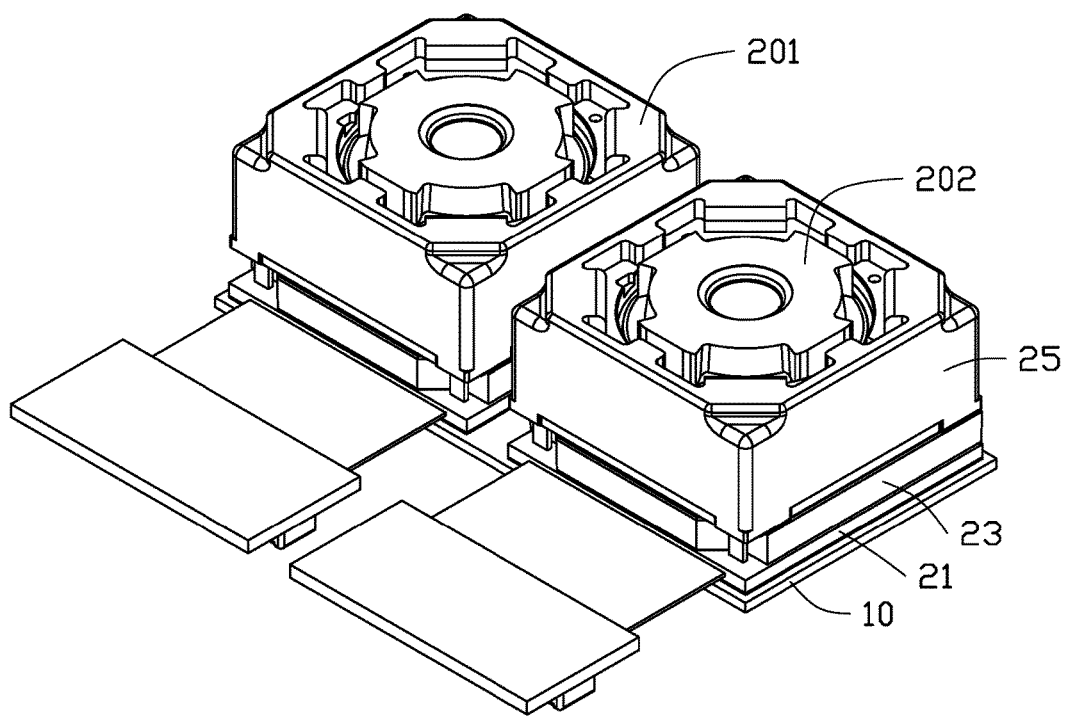
FIG. 1 is an isometric view of a double-camera imaging device in accordance with one exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Example 1

FIG. 1 illustrates an double-camera imaging device 100 according to one embodiment. The double-camera imaging device 100 includes a base bracket 10, a first camera unit 201, and a second camera unit 202. The base bracket 10 is configured to protect the first camera unit 201 and the second camera unit 202 from external force attack.

The base bracket 10 is configured to fix the first camera unit 201 and the second camera unit 202 together to form a double-camera imaging device 100. The double-camera imaging module 100 can be used as a camera of an electronic device, and the electronic device can be a mobile phone, a tablet computer, a video camera, or an electronic watch with a camera function, and so on.

Figure 2:
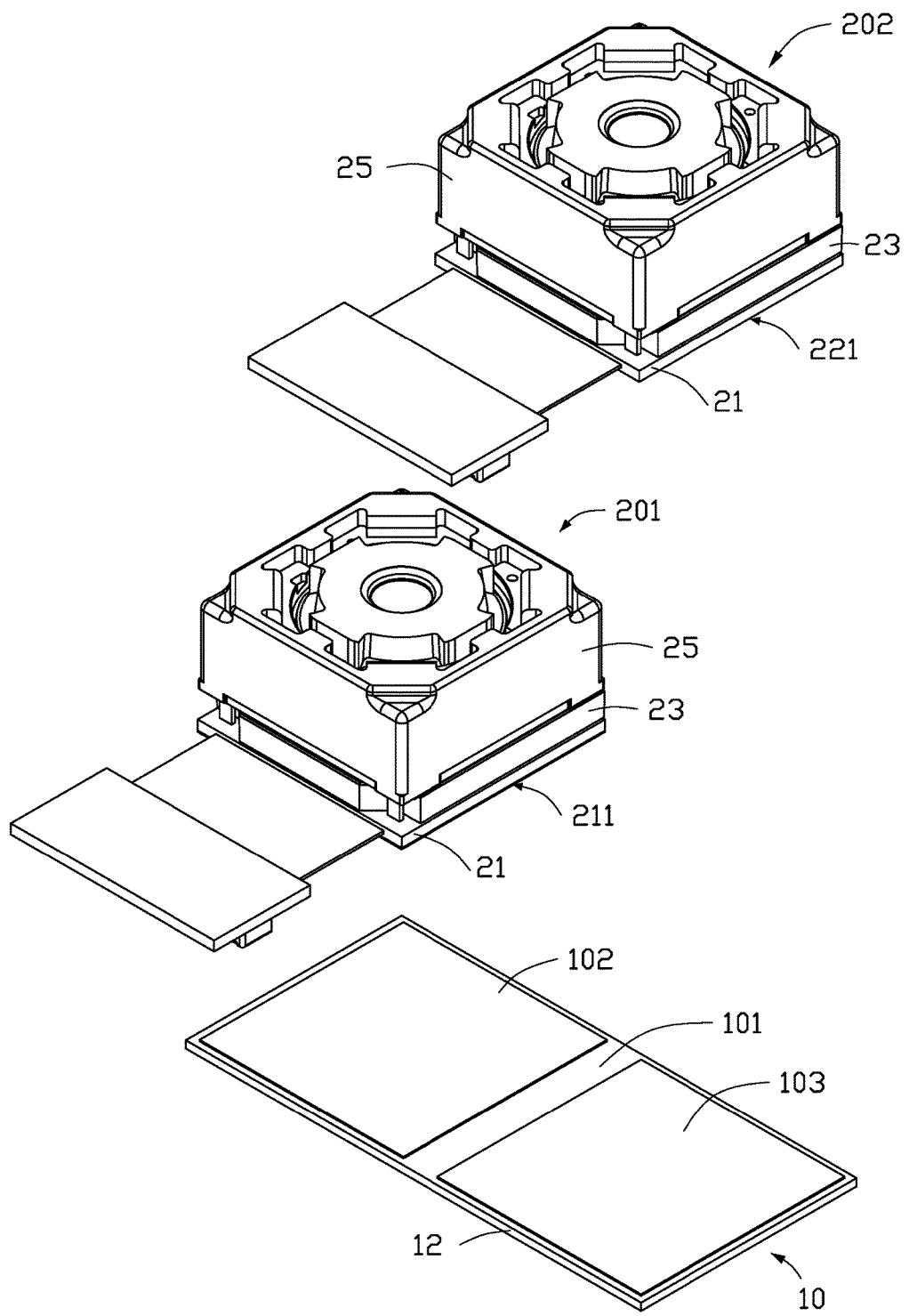
FIG. 2 is another isometric view of double-camera imaging device in FIG. 1.

The base bracket 10 is made from metal with high thermal conductivity, such as copper or aluminum. The base bracket 10 is also can be made from anti-EMI material, such as conductive foam and conductive rubber, tinplate, Be—Cu alloy, or weaving wires. Alternatively, the base bracket 10 could have a configuration like a shell. The base bracket 10 includes a base plate 12, as shown in FIG. 2. The base plate 12 comprises a mounting surface 101. The mounting surface 101 is arranged with a first adhesive layer 102 and a second adhesive layer 103 spaced apart from the first adhesive layer 102. The first adhesive layer 102 and the second adhesive layer 103 are configured to respectively fix the first camera unit 201 and the second camera unit 202 on the base bracket 10.

The first adhesive layer 102 and the second adhesive layer 103 are typically UV-curable glue, conductive adhesive, or heat-curable glue.

Figure 3:
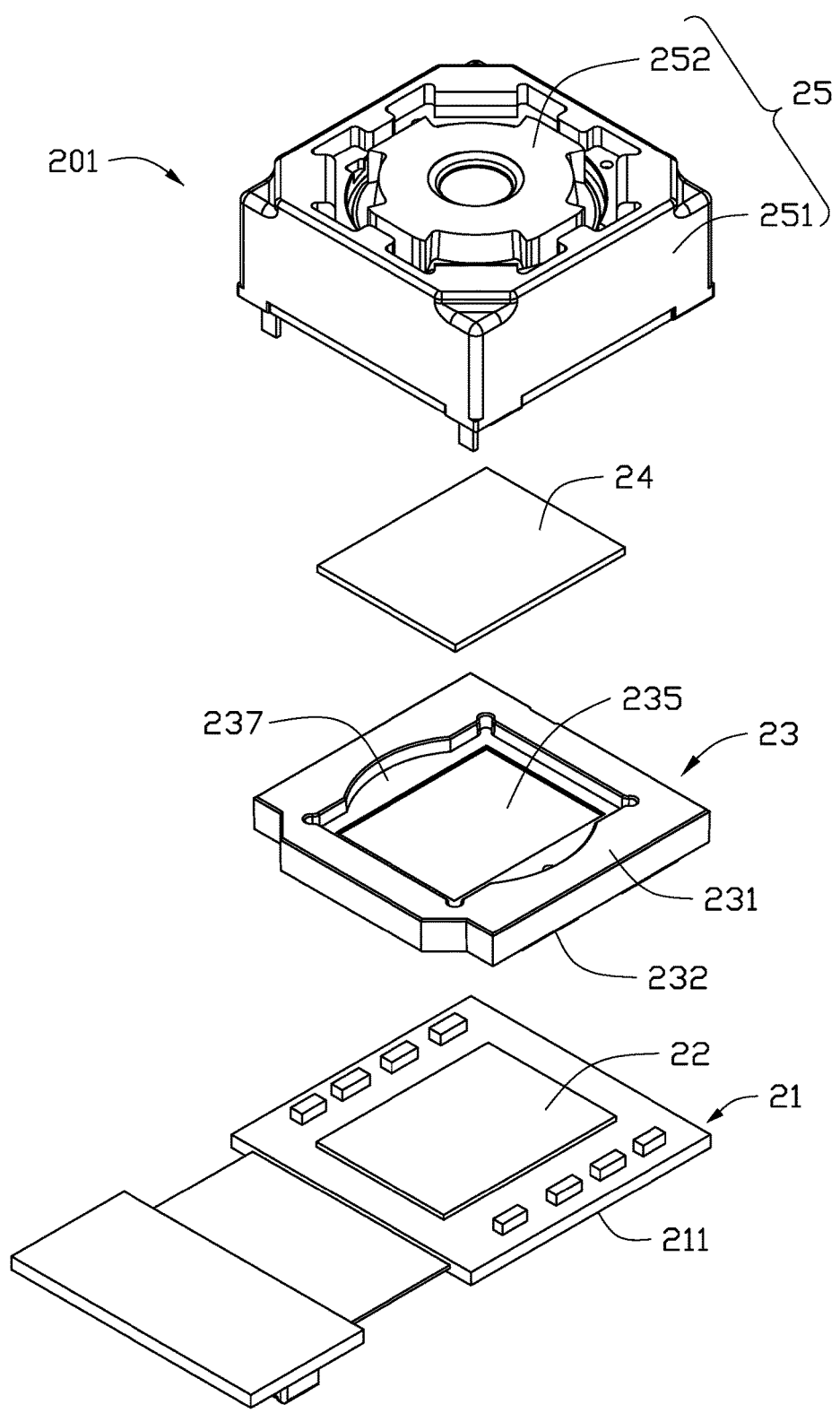
FIG. 3 is an exploded isometric view of a first camera unit of the device in FIG. 1.

The first camera unit 201 can be of any type and structure in the prior art. In this embodiment, the first camera unit 201 includes a first printed circuit board 21, an imaging sensor 22, a supporting frame 23, a filter 24, and a lens module 25, as shown in FIG. 3. That is, the first camera unit 201 is not limit to this structure shown in FIG. 3, the first camera unit 201 is able to replace to any type and structure in the prior art The first printed circuit board 21 is a flexible printed circuit board, a rigid-flexible printed circuit board, or a ceramic substrate. The first printed circuit board 21 comprises a first fixing surface 211, the first fixing surface 211 is aligned with one adhesive layer. An area of the adhesive layer is same as area of the fixing surface 211. In this illustrated embodiment, the area of the first adhesive layer 102 is same as the first fixing surface 211 of the first camera unit 201, the area of the second adhesive layer 103 is same as a second fixing surface 221 of the second camera unit 202.

The imaging sensor 22 is mounted on the first printed circuit board 21 and electrically connected with the first printed circuit board 21 using a wire (not shown). The image sensor 22 may be a complementary metal oxide semiconductor (CMOS) image sensor or a charge coupled device (CCD) image sensor.

The supporting frame 23 is fixed on the first printed circuit board 21. The supporting frame 23 is substantially a square shape and includes a top surface 231 and a bottom surface 232 opposite to the top surface 231. The supporting frame 23 includes a light through hole 235 passing through the top surface 231 and the bottom surface 232, and a step portion 237 around the light through hole 235. The top surface 231 is recessed into the bottom surface 232 to form the step portion 237. The light through hole 235 is aligned to the imaging sensor 22. The support frame 23 can be made of resin material which is elastic but not deformable, and can act as a buffer.

The filter 24 is disposed on the step portion 237 and covers the light through hole 235. The filter 24 is an IR (infra-red) blocking filter. The filter 24 can be fixed on the step portion 237 using glue, to prevent the filter 24 from shaking.

The lens module 25 includes a lens barrel 251 and a lens group 252 received in the lens barrel 251. A size of the lens barrel is substantially same as a size of the supporting frame 23. The lens module 25 is arranged on the supporting frame 23. Light enters the double-camera imaging device 100 through the lens group 252, is filtered by the filter 24 and then is collected by the image sensor 22.

The second camera unit 202 can be of any type and structure in the prior art. The second camera unit 202 is able to have a same structure or a different structure as the first camera unit 201. In the illustrated embodiment, the second camera unit 202 has a same structure as the first camera unit 201 and therefore a structure of the second camera unit 202 is not described.

The imaging module 100 is assembled according to the following steps:

First, the base bracket 10 is provided, and the first adhesive layer 102 is formed on the mounting surface 101 of the base bracket 10. In the illustrated embodiment, the first adhesive layer 102 and the second adhesive layer 103 are conductive adhesive.

Second, the first camera unit 201 is disposed on the first adhesive layer 102. The conductive adhesive is configured to firmly fix the first camera unit 201 on the base bracket 10, and the conductive adhesive is electrically connecting with the first printed circuit board 21. In this way, the first camera unit 201 is connected to ground, and thus the conductive adhesive plays a role of shielding against electromagnetic interference (EMI), and plays a role of ESD (Electro Static discharge), to meet the electrostatic protection test of the double-camera imaging device 100.

Third, the second adhesive layer 103 is formed on the mounting surface 101 of the base bracket 10, and the second adhesive layer 103 is located adjacent to the first adhesive layer 102. In the illustrated embodiment, the second adhesive layer 103 is conductive adhesive.

Fourth, the second camera unit 202 is disposed on the second adhesive layer 103, and an optical axis of the second camera unit 202 is adjusted to ensure that the optical axis of the second camera unit 202 is parallel to an optical axis of the first camera unit 201. The second adhesive layer 103 does not immediately dry, allowing the optical axis of the second camera unit 202 to be adjusted as the second camera unit 202 is positioned.

Fifth, the first adhesive layer 101 and the second adhesive layer 103 solidify to firmly fix the first camera unit 201 and the second camera unit 202 on the base bracket 10. Thereby, the image device 100 is obtained.

In this disclosure, the double-camera imaging device 100 includes the base bracket 10 arranged at bottom of the first camera unit 201 and the second camera unit 202, and the base bracket 10 is used as a buffer. The bracket 10 is configured to protect the first camera unit 201 and the second camera unit 202, so if the double-camera imaging device 100 falls to the ground, the base bracket 10 is able to avoid the rupture caused by impact of an external force, or avoid loss of electrical property or optical image blur caused by hitting the ground, etc. Heat generated by the first printed circuit board 21 can be dissipated rapidly via the base bracket 10, and the base bracket 10 exposes the first camera unit 201 and the second camera unit 202, allowing easy adjustment of an optical axis of the first camera unit 201 and an optical axis of the second camera unit 202 before they are firmly fixed on the base bracket 10, to make sure the first camera unit 201 and the second camera unit 202 meet imaging needs.

When the double-camera imaging device 100 is in use, the first camera unit 201 and the second camera unit 202 can take pictures of a same object simultaneously. The first camera unit 201 obtains a first image and the second camera unit 202 obtains a second image, and the first image and the second image contribute to a composite 3D image. Of course, the first image and the second image can also compensate each other to obtain a high definition 2D image.

Example 2

Figure 4:
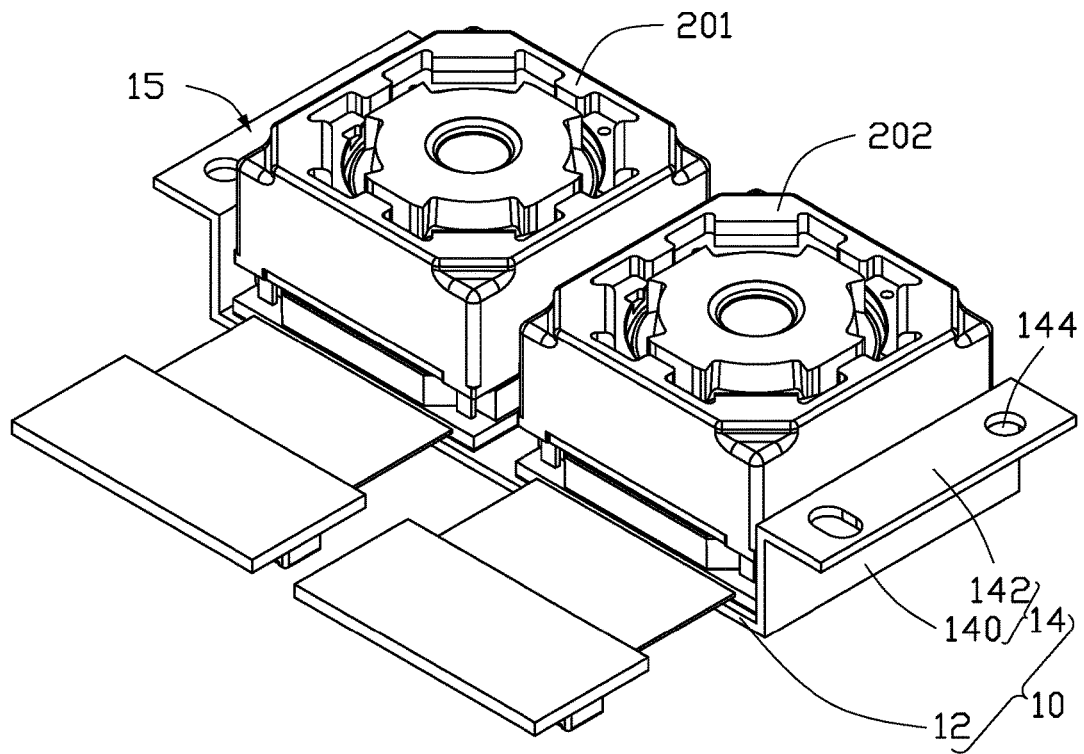
FIG. 4 is an isometric view of a double-camera imaging device in accordance with one exemplary embodiment.
Figure 5:
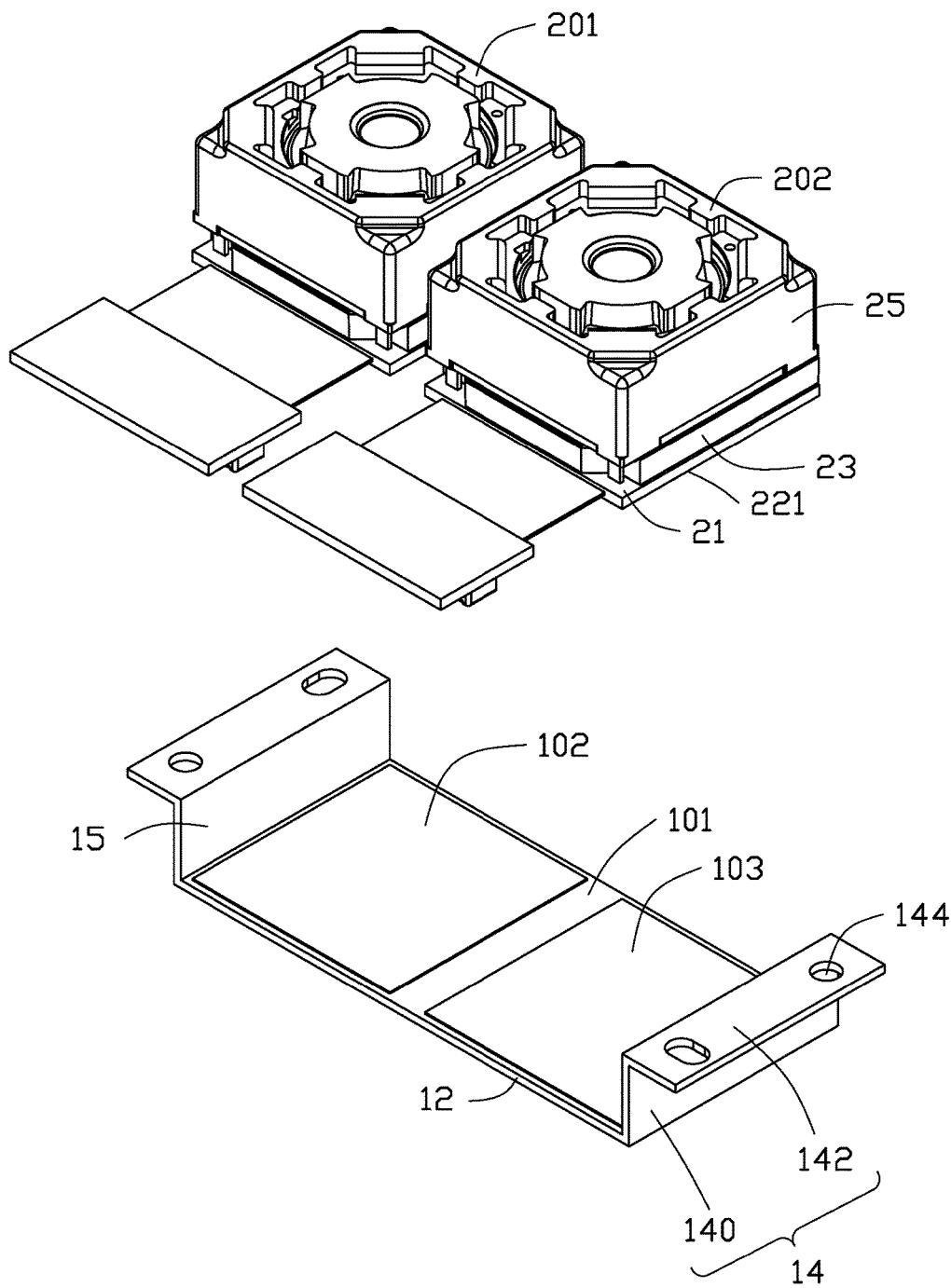
FIG. 5 is another isometric view of double-camera imaging device in FIG. 4.

FIGS. 4-5 illustrate a double-camera imaging device 200 according to another embodiment. The double-camera imaging device 200 in FIG. 3 is similar to the double-camera imaging device 100 in FIG. 2. The difference between the double-camera imaging device 200 and the double-camera imaging device 100 in FIG. 2 is that the base bracket 10 further includes a first side plate 14 and a second side plate 15 perpendicularly connected with opposite ends of the base plate 12. The first side plate 14 and the second side plate 15 are formed at short edge direction of the base plate 12.

The first side plate 14 is substantially L-shaped and includes a connecting portion 140 and a second portion 142 connecting with the connecting portion 140. The second side plate 15 is shaped generally the same as the first side plate 14. The second portion 142 further includes two mounting holes 144. Each mounting hole 144 is configured to fix the double-camera imaging device 200 with an electronic device. The first side plate 14 and the second side plate 15 are also configured to dissipate heat along the first side plate 14 and the second side plate 15.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A double-camera imaging device comprising:
a base bracket and two camera units, wherein the base bracket comprises a base plate, each camera unit comprises a printed circuit board, and the two camera units are fixed on the base plate side by side and spaced apart each other via the printed circuit boards being fixed on the base plate, and wherein the base bracket is made from metal material with high thermal conductivity.

2. The double-camera imaging device of claim 1, wherein each printed circuit board comprises a fixing surface, the base plate comprises a mounting surface, the mounting surface is arranged with two adhesive layers spaced apart from each other, and each adhesive layer is aligned with one fixing surface, and the camera units fixed on the base plate via the fixing surface fixing the adhesive layers.

3. The double-camera imaging device of claim 2, wherein the base bracket further comprises a first side plate and a second side plate located at two opposite ends of the base plate.

4. The double-camera imaging device of claim 3, wherein the first side plate and the second side plate are formed at short edge direction of the base plate.

5. The double-camera imaging device of claim 4, wherein the first side plate and the second side plate are each substantially L-shaped and comprises a connecting portion and a second portion connecting with the connecting portion, the second portion further defines two mounting holes.

6. The double-camera imaging device of claim 2, wherein the adhesive layer is UV-curable glue, conductive adhesive, or heat-curable glue.

7. The double-camera imaging device of claim 1, wherein the camera unit further comprises an imaging sensor, a supporting frame, a filter and a lens module, the imaging sensor is mounted on the printed circuit board and electrically connected with the printed circuit board, the supporting frame is fixed on the printed circuit board, comprises a light through hole exposing the image sensor and a step portion around the light through hole, the filter is arranged on the supporting frame, the lens module is fixed on the supporting frame.

8. The double-camera imaging device of claim 7, wherein the base bracket is made from anti-EMI materials.

9. The double-camera imaging device of claim 1, wherein the printed circuit board is a flexible printed circuit board, a rigid-flexible printed circuit board, or a ceramic substrate.

10. A double-camera imaging device comprising:
two camera units, each camera unit comprises a printed circuit board and an imaging sensor electrically connected on the printed circuit board, each printed circuit board comprises a fixing surface, and the fixing surface opposite to the imaging sensor;
a buffer bracket comprising a base plate located below the printed circuit board, the base plate comprises a mounting surface, wherein the mounting surface facing toward the fixing surface;
a first adhesive layer and a second adhesive are formed on the mounting surface and spaced apart from each other; and
wherein the two camera units are fixed on the mounting surface side by side via the fixing surfaces being fixed on the first adhesive and the second adhesive, wherein the first adhesive layer and the second adhesive layer are UV-curable glue, conductive adhesive, or heat-curable glue.

11. The double-camera imaging device of claim 10, wherein the buffer bracket further comprises a first side plate and a second side plate locating two opposite ends of the base plate.

12. The double-camera imaging device of claim 11, wherein the first side plate and the second side plate are formed at short edge direction of the base plate.

13. The double-camera imaging device of claim 12, wherein the first side plate has a same structure as the second side plate, the first side plate is substantially L-shaped and comprises a connecting portion and a second portion connecting with the connecting portion, the second portion further defines two mounting holes thereon.

14. The double-camera imaging device of claim 10, wherein the buffer bracket is made from metal material with high thermal conductivity.

15. The double-camera imaging device of claim 14, wherein the camera unit further comprises a supporting frame, a filter and a lens module, the supporting frame is fixed on the printed circuit board.

16. The double-camera imaging device of claim 15, wherein the buffer bracket is made from anti-EMI materials.

17. The double-camera imaging device of claim 10, wherein the printed circuit board is a flexible printed circuit board, a rigid-flexible printed circuit board, or a ceramic substrate.

* * * * *